(12) United States Patent
Chang

(10) Patent No.: US 7,615,898 B2
(45) Date of Patent: Nov. 10, 2009

(54) INTEGRATED STATOR AND ROTOR FOR A DC BRUSHLESS CEILING FAN MOTOR

(75) Inventor: Chung-Min Chang, Taichung (TW)

(73) Assignee: Rhine Electronic Co., Ltd, Taichung (TW)

( * ) Notice: Subject to any disclaimer, the term of this patent is extended or adjusted under 35 U.S.C. 154(b) by 394 days.

(21) Appl. No.: 11/670,347

(22) Filed: Feb. 1, 2007

(65) Prior Publication Data

US 2008/0169732 A1 Jul. 17, 2008

(30) Foreign Application Priority Data

Jan. 11, 2007 (TW) .............................. 96101037 A

(51) Int. Cl.
*H02K 11/00* (2006.01)
(52) U.S. Cl. ...................... 310/68 R; 310/58; 310/60 R
(58) Field of Classification Search ............... 310/68 R, 310/58, 60 R; 417/423.1, 423.14
See application file for complete search history.

(56) References Cited

U.S. PATENT DOCUMENTS

| 5,883,449 | A | * | 3/1999 | Mehta et al. | ............... | 310/60 R |
| 6,015,274 | A | * | 1/2000 | Bias et al. | ................ | 417/423.1 |
| 6,566,777 | B2 | * | 5/2003 | AbuAkeel | .................... | 310/209 |
| 7,157,872 | B1 | * | 1/2007 | Tang | ..................... | 318/400.41 |

* cited by examiner

*Primary Examiner*—Quyen Leung
*Assistant Examiner*—Leda Pham
(74) *Attorney, Agent, or Firm*—Ming Chow; Sinorica, LLC

(57) ABSTRACT

A stator and rotor for a DC brushless ceiling fan motor includes an integrated design of the stator and rotor to form an integrated stator, the integrated stator is made of a permeable material and is formed by means of a secondary production process. The DC brushless ceiling fan motor further includes an electrical controlling circuit that comprises a computer microprocessor, a power supply, a frequency converter, a phase detector and a remote control device or a manual control switch with the purpose of controlling the speed and the orientation of the motor, and thus achieving the result of low working temperature and high electrical efficiency.

2 Claims, 10 Drawing Sheets

INTEGRATED STATOR AND ROTOR FOR A DC BRUSHLESS CEILING FAN MOTOR

BACKGROUND OF THE INVENTION

1. Field of the Invention

The present invention relates to a DC brushless ceiling fan motor. More particularly, the present invention relates to an improvement on the stator and rotor therein.

2. Description of Related Art

In general, a conventional ceiling fan motor has an AC monophase motor design, and the motor stator 40 is made up of a stack of silicon steel laminations 41 formed by a punch machine with an individual thickness of 0.5~1.0 mm (as shown in FIG. 10). Regarding the process of making such a stator 40, first, every formed silicon steel lamination 41 must be stacked on one another. Second, the rivets are used to secure each silicon steel lamination 41 forming a stacked lamination. Although this kind of method has been used for years, it still has some improvable defects, such as:

1. Poor efficiency: The conventional AC monophase ceiling fan motor uses a shoe box-like electric machinery design. This design type has lower power factors that could result in increased power consumption and electrical inefficiency.

2. High working temperature: As mentioned, due to the lower power factors of the conventional motor design, the efficiency of the motor is lessened. Therefore, after the conventional AC motor has been working at full speed for a short time, the temperature of the inner windings of the motor will rise significantly, up to nearly 100° C. After a short period of use, the insulating materials of the inner motor will wear due to the high temperature and will thus provide less and less insulation over time, further resulting in leakage of electricity and eventually resulting in a short circuit. In addition, because the bearings of the motor have been installed in this high temperature environment, the lubricity of the bearings could also gradually wear off over time. As a result, the bearings will produce a noise due to the abnormal friction, and the loss of lubrication could lead to a lockup of the bearings.

3. Unstable production quality: Instability results from the fact that the stator is made up of a stack of silicon steel laminations 41 and secured by rivets. The two production processes involved in stacking the silicon steel laminations 41 and securing the silicon steel laminations 41 could result in some assembly inaccuracies that influence the stability of the original product measurements. Because of such unpredictable inaccuracies, it is not possible to mass produce these products.

The present invention is intended to improve upon the above mentioned drawbacks of the conventional AC monophase ceiling fan motor. The present invention provides a new stator and rotor design for a DC brushless ceiling fan motor and provides a usage improvement for the materials of the stator and rotor.

SUMMARY OF THE INVENTION

The primary object of the present invention is a DC brushless ceiling fan motor containing a stator and motor therein made of permeable material and integrated by a secondary production process. In addition to the integrated stator and rotor structure, the present invention also provides an electrical controlling circuit that drives the electric motor. The controlling circuit comprises a computer microprocessor, a power supply, a power filter, a frequency converter, a phase detector, a position encoder and a manual control switch or a remote control device used to control the speed and the orientation of the motor increasing efficiency and power saving capabilities.

Other objects, advantages and novel features of the invention will become more apparent in the following detailed description taken in conjunction with the accompanying diagrams.

DETAILED DESCRIPTION OF PREFERRED EMBODIMENT

Figure 1:
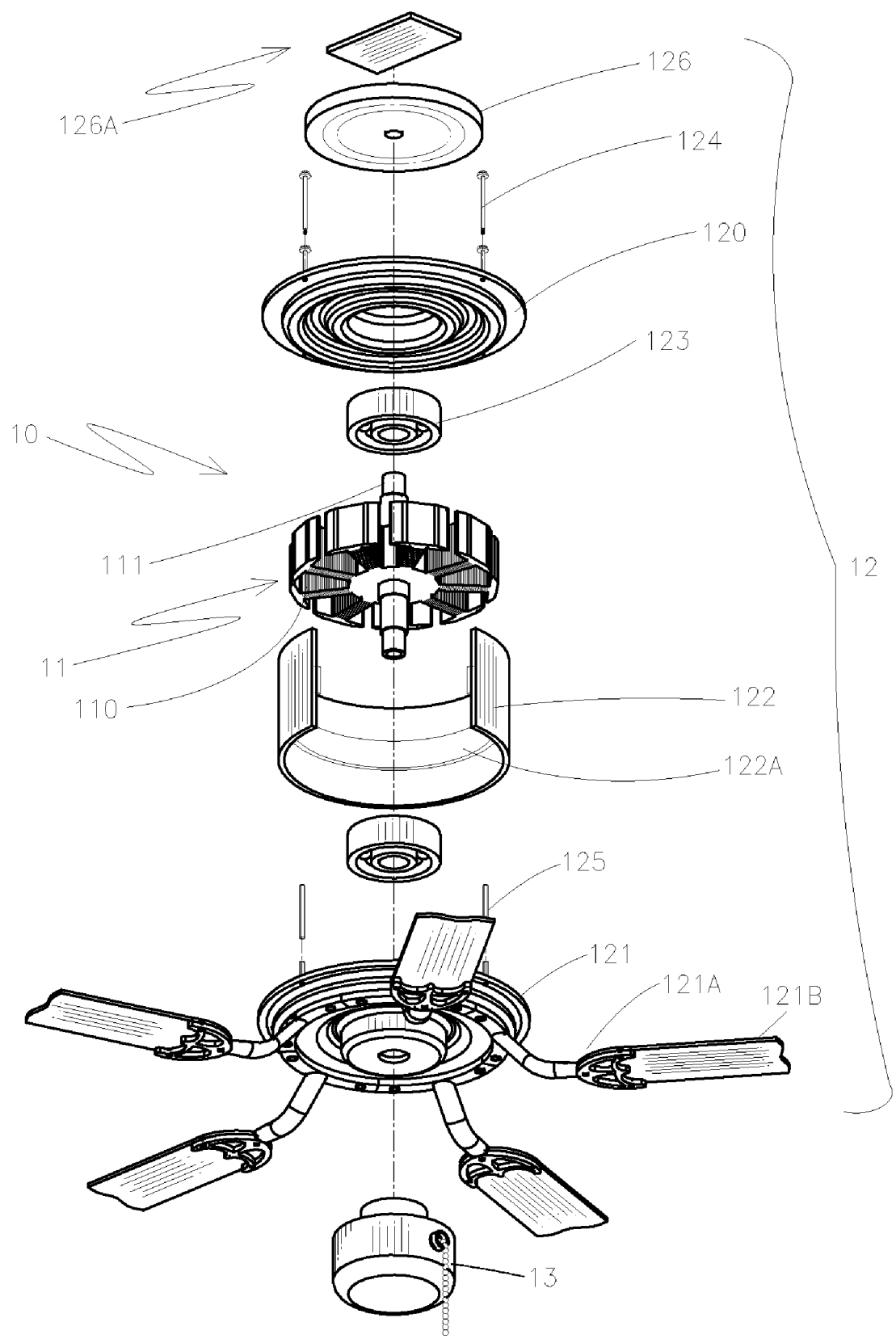
FIG. 1 is an exploded view of a ceiling fan containing the present invention.

While this invention is capable of embodiment in many different forms, shown in the drawings and herein described in detail is the preferred embodiment of the invention. The preferred embodiment in disclosed with the understanding that the present description is but one example of the principles of the invention and is not intended to limit the broad aspects of the invention to the single embodiment illustrated.

Figure 2:
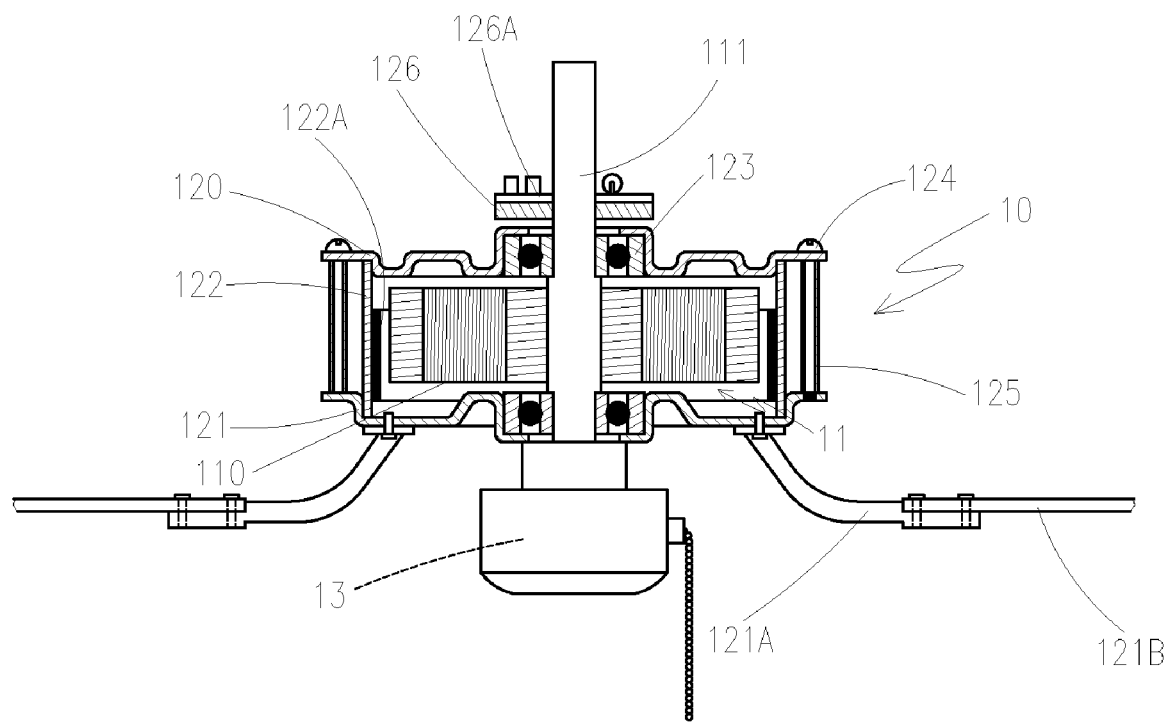
FIG. 2 is a cross-sectional view of the present invention illustrating the structure of the motor.
Figure 3:
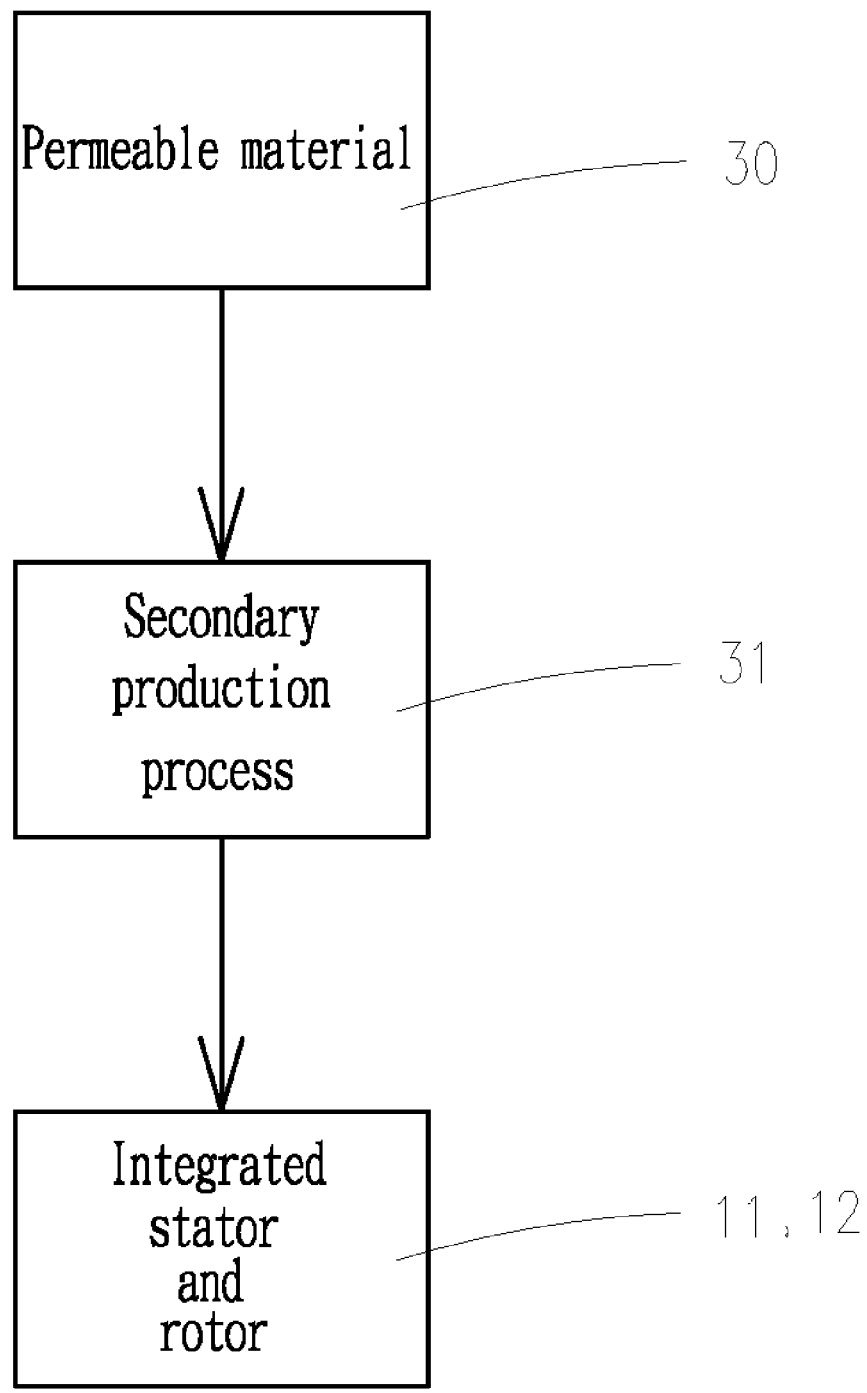
FIG. 3 is a production flowchart for an integrated stator and rotor of the present invention.
Figure 4:
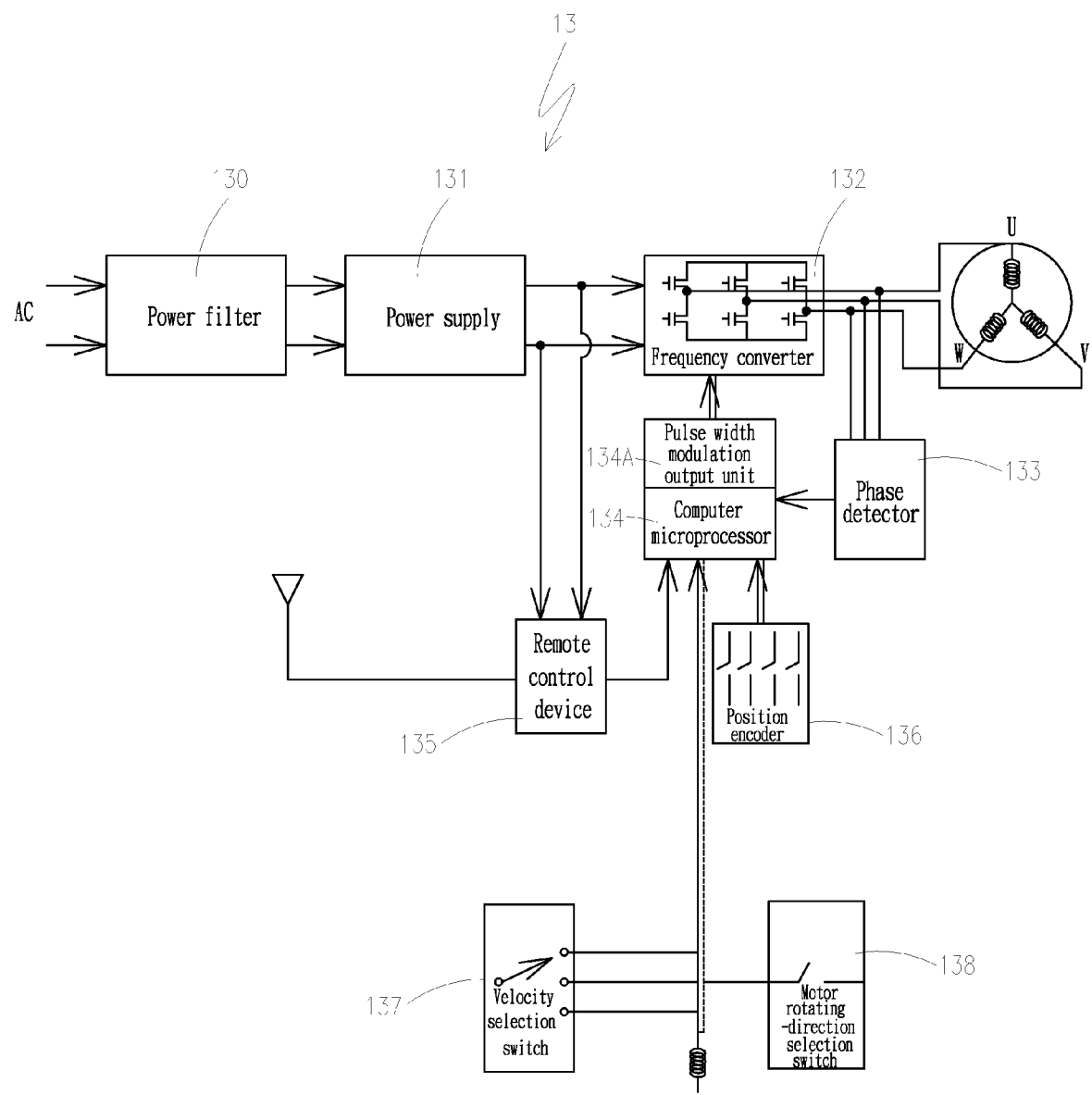
FIG. 4 is the circuitry for a remote control circuit of the present invention.
Figure 5:
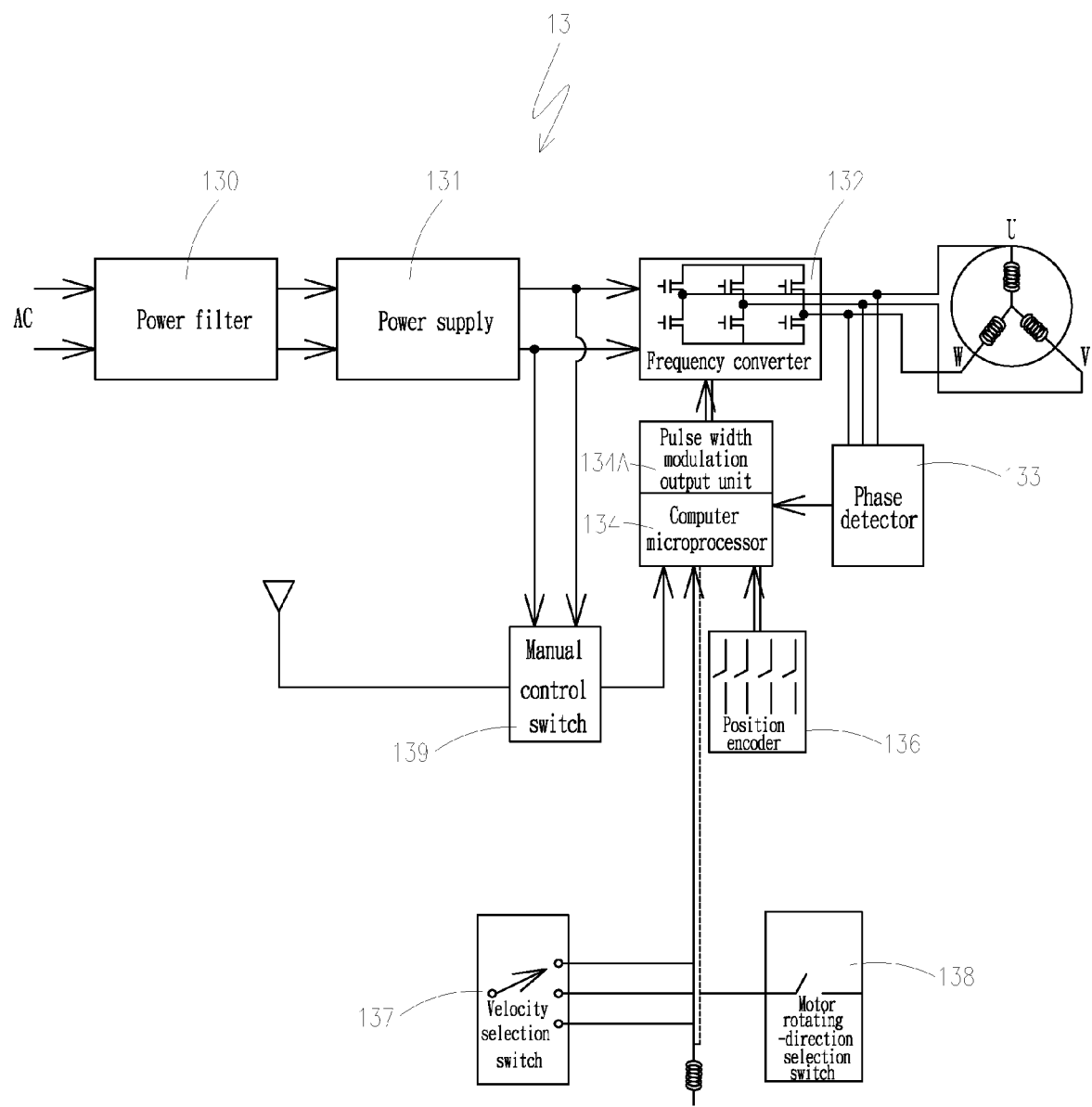
FIG. 5 is the circuitry for a manual control circuit of the present invention.

FIG. 1 is an exploded view of the ceiling fan, FIG. 2 is a cross-sectional view of the motor, FIG. 3 is a flowchart of production, FIG. 4 illustrates the circuitry for a remote control circuit and FIG. 5 illustrates the circuitry for a manual control circuit. The present invention comprises:

An integral stator 11, wound around a windings 110, and the core of the stator 11 provides a central axle 111. The integral stator 11 is made of a permeable material and is formed by means of a secondary production process 31.

The rotor 12 includes a top lid 120, a lower bottom 121 and a circular casing 122. The circular casing 122 is located between the top lid 120 and the lower bottom 121, and a permanent magnet 122A has been installed on the inner wall of the circular casing 122. In addition, the bearings 123 are located in the inner space of the circular casing 22 and are located between the top lid 120 and the lower bottom 121. Radial blade shafts 121A extend from the lower bottom 121, and the blades 121B of the ceiling fan are secured to the blade shafts 121A. At the periphery of the circular casing 122 there are multiple screw sleeves 125 that attach to the top lid 120 and the lower bottom 121. The top lid 120 contains an opening that corresponds to the screw sleeve 125, and the lower bottom 121 also contains a screw hole on its surface corresponding to the screw sleeve 125. A screw 124 can be passed through the opening of the top lid 120 and screw sleeve 125 and secured to the screw hole of the lower bottom 121. A receiver carrier 126 is located above the top lid 120 and comprises an inner receiver 126A. A stator 11 is installed between the top lid 120 and the lower bottom 121 by passing the axle 111 through the bearings 123 located between the top lid 120 and lower bottom 121.

An electrical controlling circuit 13, comprised of a power filter 130, a power supply 131, a frequency converter 132, a phase detector 133, a computer microprocessor 134, a remote control device 135 or a manual control switch 139, a position encoder 136, a velocity selection switch 137 and a motor rotating-direction selection switch 138, wherein the computer microprocessor 134 is further comprised of a pulse width modulation output unit 134A, and the controlling circuit 13 is installed in the rotor 12;

FIG. 4 and FIG. 5 are the circuitries for a remote control circuit and a manual control circuit. The frequency converter 132 is defined in the controlling circuit 13 and can be used for eliminating the interference of the signal noise while the circuit 13 is in use. A power supply 131 provides a DC voltage to the frequency converter 132 as well as a lower DC voltage to the computer microprocessor 134, the remote control device 135 or a manual control switch 139, the velocity selection switch 137, the motor rotation-direction selection switch 138 and the phase detector 133. The frequency converter 132 drives the DC brushless motor 10 by receiving a driving signal from the pulse width modulation output unit 134A and thus the U, V, W of motor windings are excited/unexcited so that the direction of the current alternates, thereby driving the motor to turn by means of excitation. The remote control device 135 or the manual control switch 139 is used for controlling the speed and the rotation orientation of the DC brushless motor 10. The phase detector 133 is used for keeping the DC brushless motor 10 rotating as determined by the timing of the electrification of the windings 110, i.e., when a permanent magnet 122A is moved by the windings 110, the windings 110 detect a change of the permanent magnet 122A and induct a counter electromotive force (counter EMF) that generates a signal used to determine the timing of the current input to the windings 110. The manual control switch 139 is provided to adjust the speed of the DC brushless motor 10 as set by the computer microprocessor 134. The speed of the motor 10 is adjusted by turning the switch 139 ON and OFF repeatedly, the speed of which can be adjusted to increase or decrease in sequence, when it turns OFF for 5 seconds or more, and then turns ON, the speed of motor will be unchanged before it returns to the OFF position (not shown).

Figure 6:
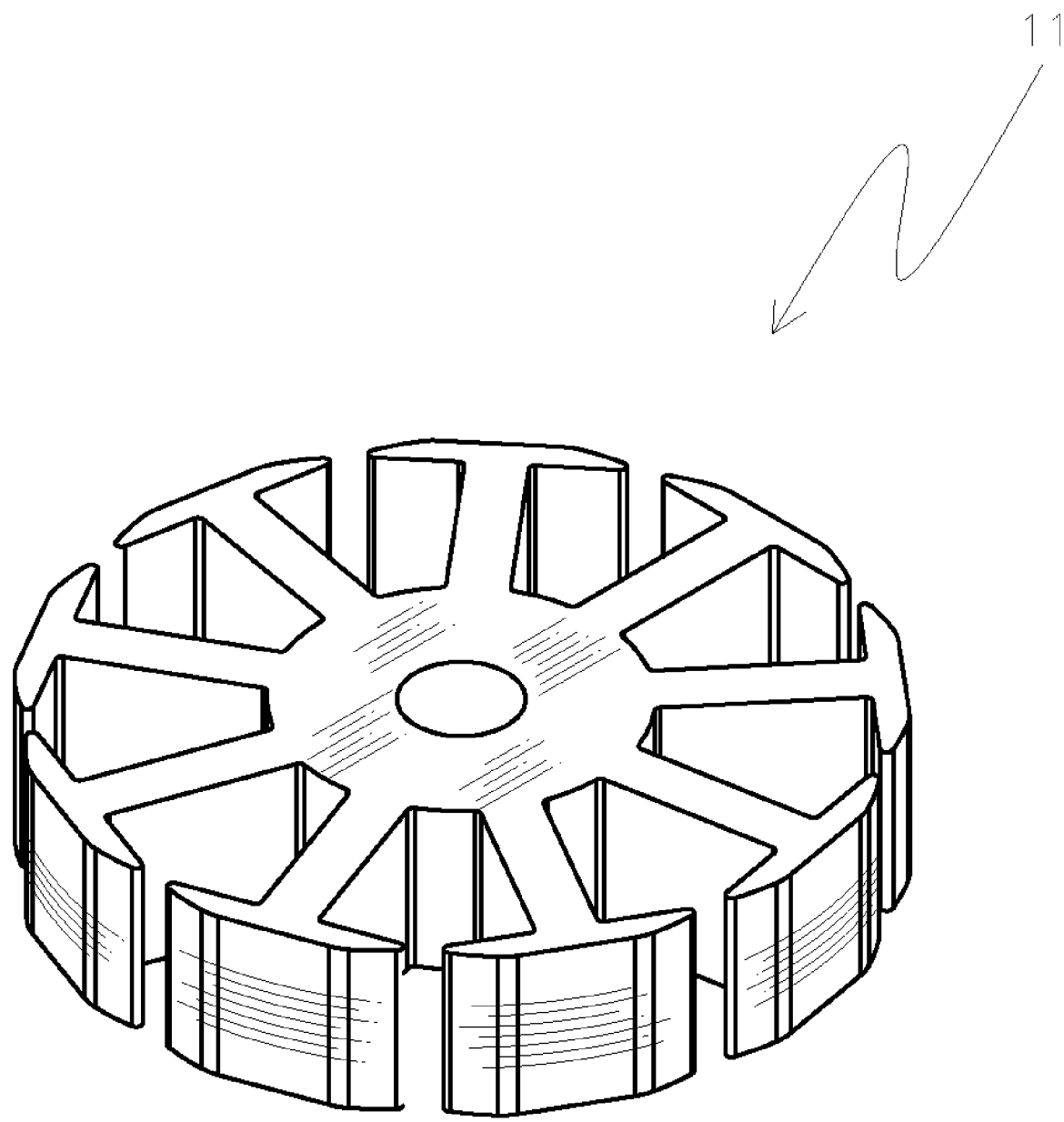
FIG. 6 is a perspective view of an integrated stator of the present invention.
Figure 7:
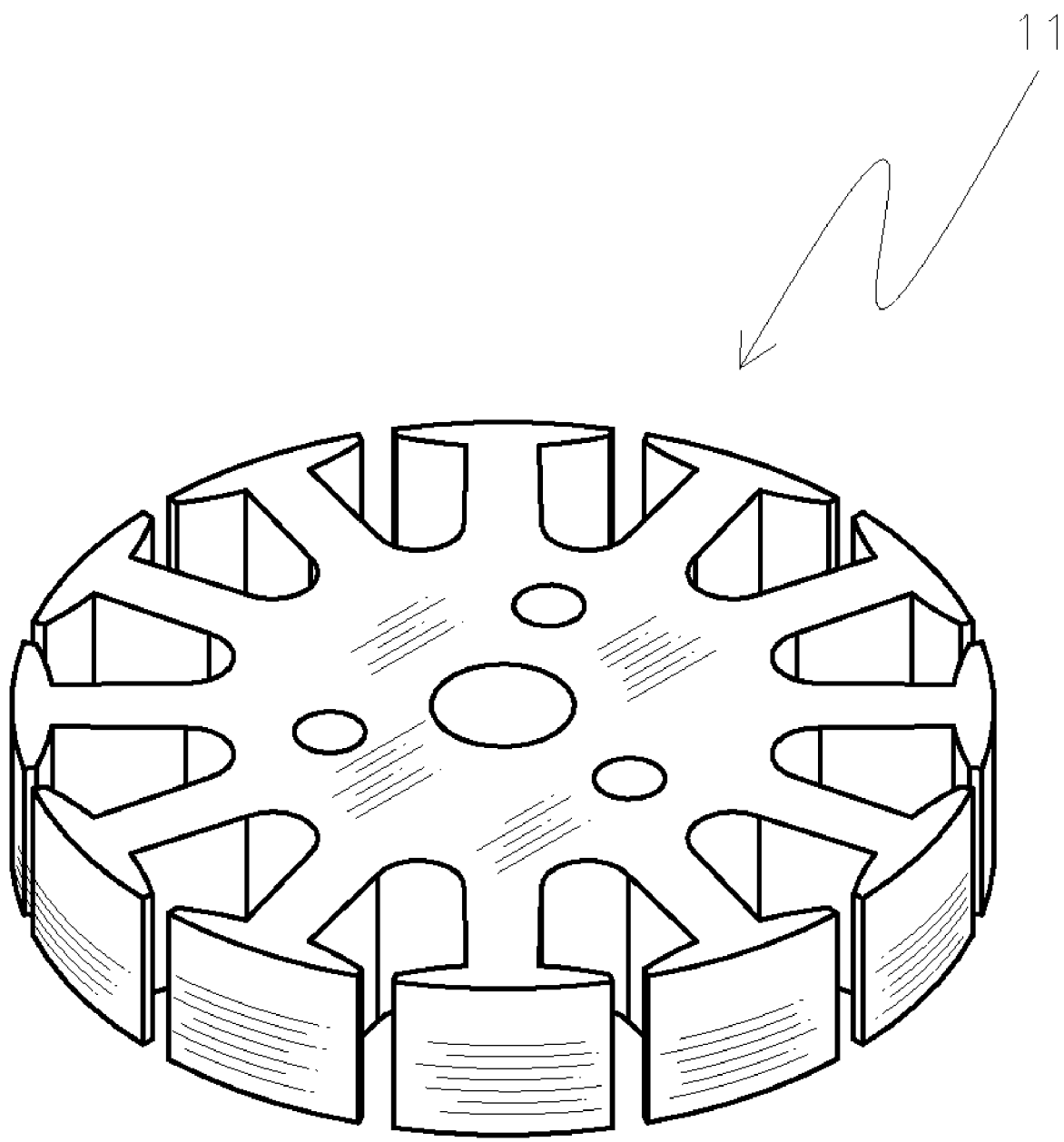
FIG. 7 is a perspective view for another embodiment of the integrated stator.

Referring to FIG. 3, FIG. 6 and FIG. 7, the stator 11 and the rotor 12 are made of a permeable material 30 and are produced by a secondary production process 31. The stator 11 can be produced in various sizes.

Figure 8:
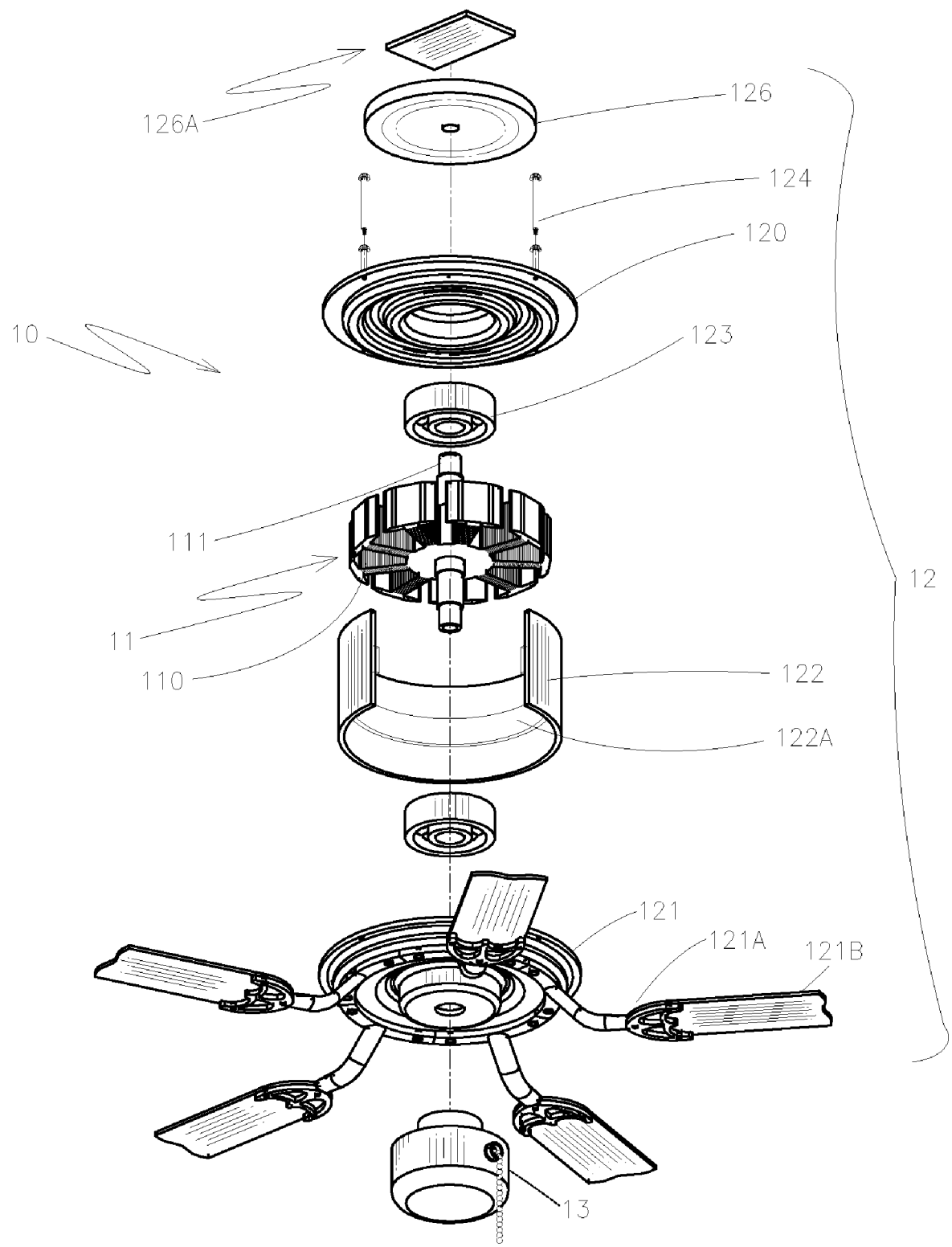
FIG. 8 is an exploded view of the ceiling fan for a first embodiment of the present invention.
Figure 9:
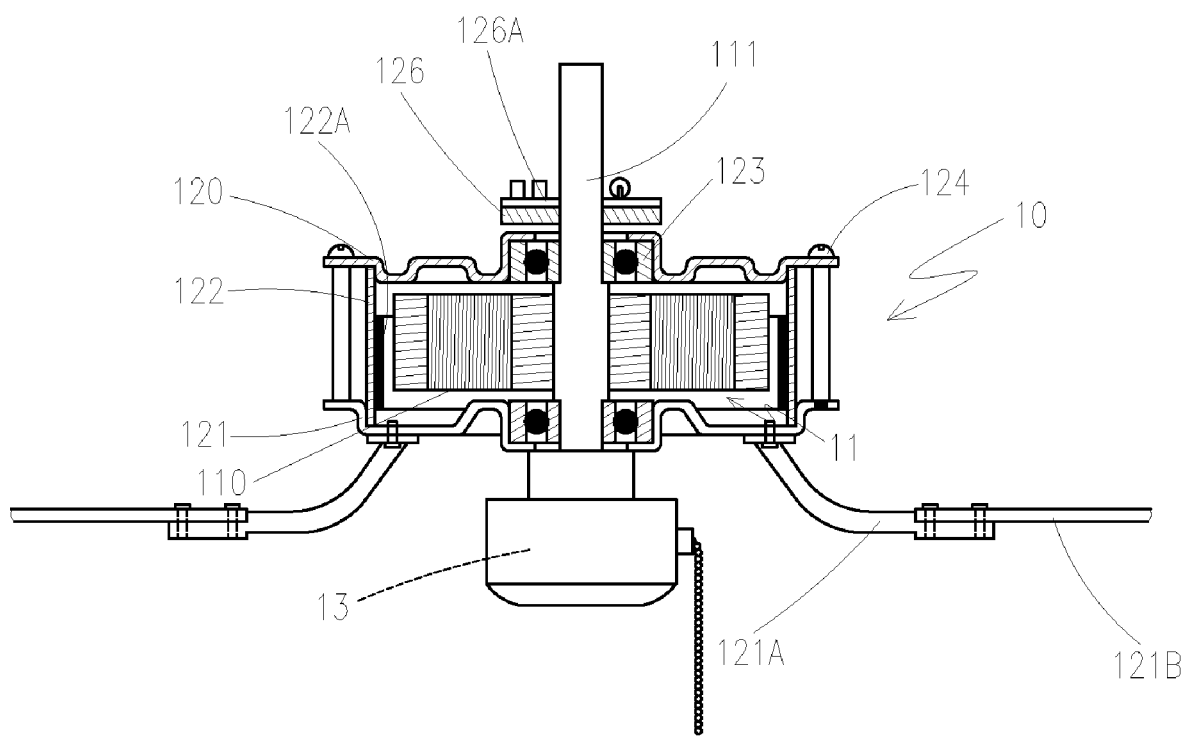
FIG. 9 is a cross-sectional view of the present invention as displayed in FIG. 8.
Figure 10:
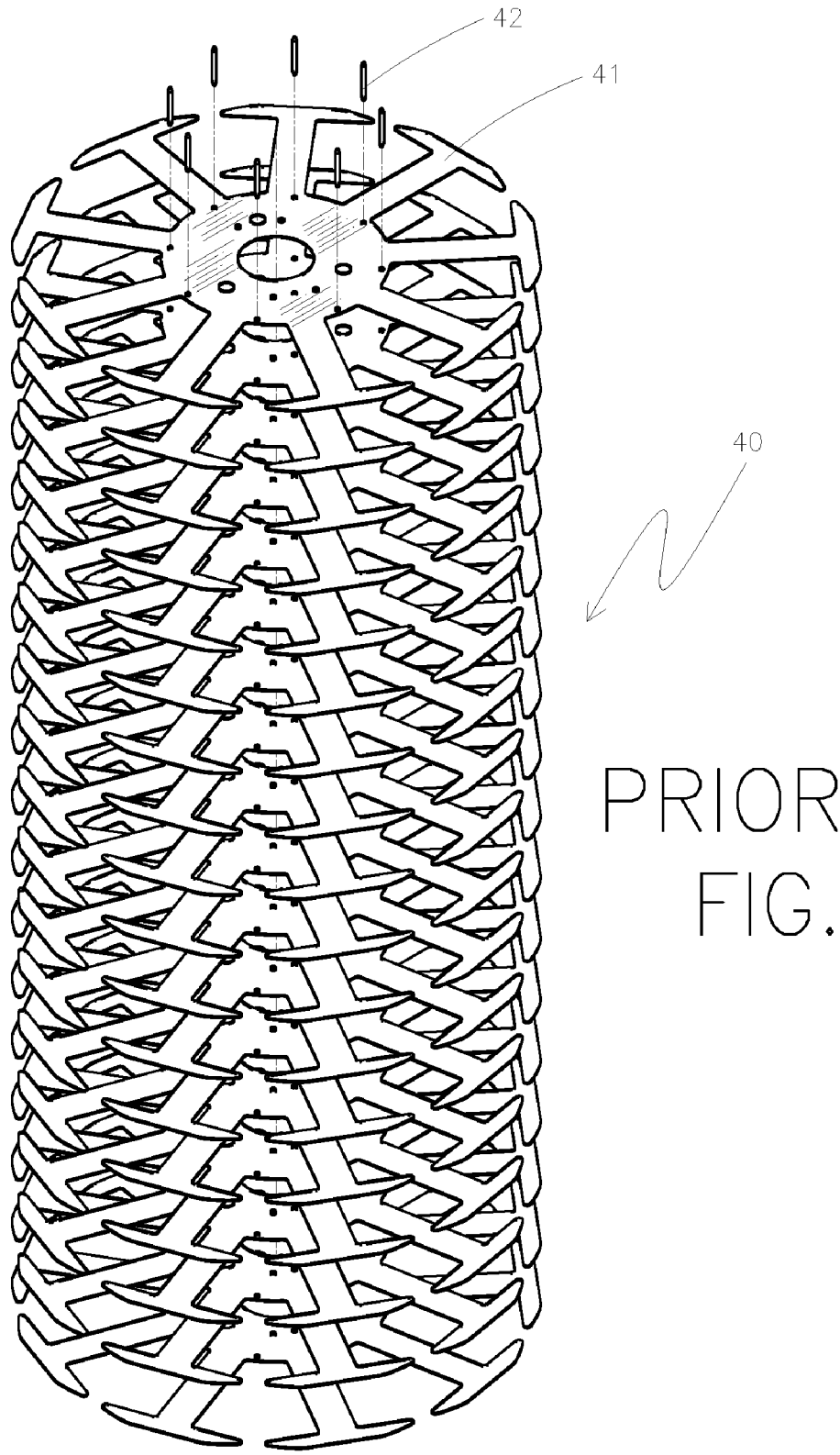
FIG. 10 is an exploded view of a stator from a conventional ceiling fan motor.

Referring to FIG. 8 is the first embodiment of the present invention and the FIG. 9 is its sectional view. The structure of the first embodiment is similar to FIG. 1 to FIG. 5 except for the screws 124 and the screw sleeves 125 are integral in order to simplify the complexity.

Although numerous characteristics and advantages of the present invention have been set forth in the foregoing description, together with details of the structure and function of the invention, this disclosure is one example only, and changes may be made with regard to specific details, particularly in matters of shape, size, and arrangement of parts within the invention to the full extent indicated by the general meaning of the terms in which the appended claims are expressed.

What is claimed is:

1. A DC brushless ceiling fan motor having a stator and a rotor therein, comprising:

an integral stator including windings and a central axle, the integral stator is made of a permeable material and is formed by means of a secondary production process;

a rotor including a top lid, a lower bottom and a circular casing, wherein the circular casing is located between the top lid and the lower bottom, and a permanent magnet is installed on the inner wall of the circular casing, in addition, the bearings are provided in the inner space of the circular casing located between the top lid and the lower bottom, radial blade shafts extend from the lower, and the blades of the ceiling fan are secured to the blade shafts; at the periphery of the circular casing, there are multiple screw sleeves attached to the top lid and the lower bottom, the top lid contains an opening that corresponds to the screw sleeve, and the lower bottom also contains a screw hole corresponding to the screw sleeve such that a screw can be passed through the opening of the top lid and the hollow screw sleeve and can be secured to the screw hole of the lower bottom; a receiver carrier is provided above the top lid and comprises an inner receiver; the stator is installed between the top lid and the lower bottom by passing the axle through the bearings that are located between the top lid and lower bottom;

an electrical controlling circuit that is provided in the rotor; and the electrical controlling circuit comprising of a power filter, a power supply, a frequency converter, a phase detector, a computer microprocessor, a remote control device or a manual control switch, a position encoder, a velocity selection switch and a motor rotating-direction selection switch, wherein the computer microprocessor further includes a pulse width modulation output unit.

2. The DC brushless ceiling fan motor as claimed in claim 1, wherein the frequency converter is provided to eliminate signal noise interference while the circuit is in use; the power supply provides a DC voltage to the frequency converter as well as a lower DC voltage to the computer microprocessor, the remote control device or a manual control switch, the velocity selection switch, the motor rotating-direction selection switch and the phase detector; the frequency converter drives the DC brushless motor by receiving a driving signal output from the pulse width modulation output unit and thus the U, V, W of motor windings are excited/unexcited so that the direction of the current is alternately changed, thereby driving the motor to turn by means of excitation; the remote control device or the manual control switch is used for controlling the speed and the rotating orientation of the DC brushless motor; the phase detector is used to keep the DC brushless motor rotating as determined by the timing of the electrification of the windings, i.e., when a permanent magnet is moved by the windings, the windings detect a change of the permanent magnet and induct a counterelectromotive force (counter EMF) to generate a signal, the signal is used for determining the timing of the current input to the windings; the manual control switch is provided to adjust the speed of the DC brushless motor, as for the stage of the speed which is set by the computer microprocessor; the speed of motor is adjusted by turning the switch ON and OFF repeatedly, which can be adjusted to increase or decrease in sequence, when turned OFF for 5 seconds or more, and then turned ON, the speed of motor will be unchanged before returning to the OFF position.

* * * * *